United States Patent [19]

Biffar et al.

[11] Patent Number: 4,659,683

[45] Date of Patent: Apr. 21, 1987

[54] REGENERATION OF INACTIVE AND POISONED PLATINUM CATALYSTS

[75] Inventors: Werner Biffar, Frankenthal; Otto Hofstadt, Ludwigshafen; Klaus Kartte, Beindersheim; Erwin Thomas, Freinsheim; Franz-Josef Weiss, Neuhofen, all of Fed. Rep. of Germany

[73] Assignee: BASF Aktiengesellschaft, Fed. Rep. of Germany

[21] Appl. No.: 835,271

[22] Filed: Mar. 3, 1986

[30] Foreign Application Priority Data

Mar. 6, 1985 [DE] Fed. Rep. of Germany ....... 3507832

[51] Int. Cl.$^4$ .................. B01J 23/96; B01J 38/68; C22B 11/04; C01B 21/14
[52] U.S. Cl. ......................... 502/24; 75/108; 75/121; 423/22; 423/387; 502/27; 502/185; 502/516
[58] Field of Search ................. 502/24, 22, 27, 516, 502/185; 423/22, 387; 75/108, 121

[56] References Cited

U.S. PATENT DOCUMENTS

| | | | |
|---|---|---|---|
| 2,787,540 | 4/1957 | Appell | 75/108 |
| 3,060,133 | 10/1962 | Jockers et al. | 423/387 |
| 3,337,555 | 8/1967 | Billman | 75/108 |
| 4,062,927 | 12/1977 | De Rooij et al. | 423/387 |

FOREIGN PATENT DOCUMENTS 1061574  9/1979  Canada ................ 423/22

*Primary Examiner*—P. E. Konopka
*Attorney, Agent, or Firm*—Keil & Weinkauf

[57] ABSTRACT

Noble metal catalyst, in particular platinum catalysts, which are applied on carriers and have become poisoned by metals as a result of being used for many years in the preparation of hydroxyl-ammonium salts by catalytic reduction of nitric oxide with hydrogen in an aqueous mineral acid are regenerated by a process in which the metallic impurities are dissolved using nitric acid or aqua regia, the solution is neutralized, the troublesome metals are precipitated from the neutralized solution by means of a selective precipitating reagent, and the purified platinum solution is reused for the preparation of the catalyst. Organic complexing agents which form insoluble or sparingly soluble complexes with the metallic impurities are preferably used as precipitating reagents.

1 Claim, No Drawings

REGENERATION OF INACTIVE AND POISONED PLATINUM CATALYSTS

It is known that hydroxylammonium salts can be prepared by catalytic reduction of nitric oxide with hydrogen over a platinum-containing catalyst in an acidic medium. The activity, selectivity and life of the catalyst used are of substantial importance with regard to the industrial feasibility of the process.

In this process, the supported platinum catalyst used exhibits a marked loss of selectivity and activity when used in a reactor over a period of a few weeks. Hence, the catalyst has to be regenerated periodically. The particular regeneration method used also has a great effect on the on-stream time of the catalyst, defined as the time during which the catalyst remains in continuous operation in the reactor. German Patent No. 1,088,037 describes a conventional regeneration process and its effect on the subsequent operating periods.

In spite of periodic regeneration, a catalyst used over a relatively long time slowly loses its initial catalytic properties; the selectivity decreases and the on-stream times become shorter. More frequent regeneration is required.

These long-term effects are essentially due to the fact that the catalyst becomes increasingly coated with metals which have a poisoning effect. These are conveyed to the catalyst via the acidic reaction medium when corrosion of steel pipes and kettles occurs. During regeneration, it is possible substantially to dissolve the metals with aqua regia; however, when the platinum is precipitated by reduction, they are deposited again together with the platinum onto the catalyst carrier.

The conventional processes for removing these metal impurities from the catalyst were unsuccessful because they were too complicated technically and the purification entailed large platinum losses.

It is an object of the present invention to provide a process for regenerating the initial catalytic properties of supported platinum catalysts which have been employed over a period of many years and are used in the preparation of hydroxylammonium salts by catalytic reduction of nitric oxide with hydrogen in an aqueous solution of mineral acid.

The present invention relates to a process for the purification of poisoned supported platinum catalysts which overcomes the above disadvantages.

We have found that this object is achieved and that, surprisingly, noble metal catalysts, in particular platinum catalysts, which are applied on carriers and have become poisoned by metals as a result of being used over a period of many years in the preparation of hydroxylammonium salts by catalytic reduction of nitric oxide with hydrogen in an aqueous mineral acid can be regenerated without a particularly complicated technical procedure or expensive apparatus, if the metal impurities are dissolved with nitric acid or aqua regia, the solution is neutralized, the troublesome metals are precipitated from the neutralized solution by a selective precipitating reagent, and the purified platinum solution is reused for the preparation of the catalyst.

When the platinum catalyst is laden with a large amount of heavy metals, the metal impurities can be dissolved in aqua regia.

Organic complexing agents which, together with the metal impurities, form complexes which are insoluble or sparingly soluble in water, eg. quinoline, carbazone, aminohydroxybenzene and anthraquinone derivatives, can advantageously be used as selective precipitating reagents. The noble metal losses are kept to a minimum by the process according to the invention.

In general, dilute nitric acid itself is capable of dissolving a large part of the metal impurities, and the platinum remains essentially undissolved on the carrier. After neutralization of the filtered nitric acid solution, the troublesome metals present therein in concentrated form can be precipitated selectively, while the small amounts of platinum present remain in solution. Suitable selective precipitating agents are complexing agents which form sparingly soluble complexes with the troublesome transition metals but not with platinum. When the precipitate has been separated off, the filtrate can be suspended with the prepurified catalyst in dilute aqua regia, and the suspension further processed.

In the treatment with dilute nitric acid, the troublesome metals are not completely separated off. For further concentration of the metal impurities, it is advantageous to suspend the catalyst in a nitric acid/hydrochloric acid mixture (aqua regia). In this procedure, platinum as well as all troublesome metals are dissolved from the carrier. The carrier, e.g. graphite, is separated off, after which the aqua regia solution is neutralized and a selective precipitating agent is added. The virtually platinum-free precipitate is separated off and can be discarded or worked up further. The carrier can be again suspended in the purified platinum solution, and the noble metal precipitated in a conventional manner. Alternatively, fresh carrier material can be employed.

If it is in any case intended to replace the carrier, selective precipitation of the metals may also be carried out directly after suspending the old catalyst in aqua regia and neutralizing the suspension. In this case, the carrier and the precipitate can be isolated together and discarded.

A number of organic complexing agents which, together with the metallic impurities, form complexes which are insoluble or sparingly soluble in water have proven useful as selective precipitating reagents. 8-Hydroxyquinoline, quinosol, 5,7-dibromo-8-hydroxyquinoline, quinaldine and 1,5-diphenylthiocarbazone are particularly suitable, while alizarin and 1,2-aminohydroxybenzene derivatives are also useful. They can be introduced in stoichiometric amounts, depending on the content of the troublesome metals. The amount required can generally be determined visually by virtue of the fact that, when the precipitating reagent is added, precipitation is complete when the stoichiometric amount is exceeded.

The advantages of the process are that it can be carried out without a technically complicated procedure in the course of the normal regeneration, the total life of the catalyst, i.e. the interval between complete replacement of the catalyst, is substantially lengthened, and the old catalyst can be worked up directly in the factory.

EXAMPLES

A. Purification of the catalysts 1. 50 g of a platinum catalyst on graphite used over a period of several years are stirred in dilute $HNO_3$ solution for 16 hours at 80° C. The catalyst is separated off and suspended in dilute aqua regia. The nitric acid solution filtrate is neutralized with sodium carbonate until the pH reaches 6–7, and a 3.5% strength 8-hydroxyquinoline acetate solution is metered in dropwise until no further precipitate is formed on further addition. The precipitate is separated off, and the filtrate is combined with the suspension of the prepurified catalyst in aqua regia. After neutralization with sodium carbonate at pH 5 and the addition of sodium acetate, tetravalent platinum is reduced completely to the divalent state at 80° C. with 3% strength aqueous sodium dithionite solution, reductive precipitation onto graphite is effected with concentrated formic acid and, when the reaction is complete, the product is washed. The content of troublesome metal ions is found to have been reduced by 50%.

2. 600 g of dry used platinum catalyst on a carrier is purified and regenerated as described in Example 1.

3. 50 g of a used platinum catalyst on a carrier employed over a period of several years are stirred in dilute aqua regia for 16 hours at 80° C. The carrier is separated off, after which the filtrate is neutralized with sodium carbonate until the pH reaches 4–5, and a 10% strength aqueous quinosol solution is added dropwise until precipitation no longer takes place on further addition. The sparingly soluble precipitate is separated off, after which the filtrate is combined with the carrier, and dilute aqua regia is added. Stirring is carried out for 3 hours at 80° C., the catalyst suspension is brought to pH 5 with sodium carbonate, sodium acetate is added at 80° C., and 3% strength aqueous sodium dithionite solution is then introduced. This reduces tetravalent platinum completely to divalent platinum. The noble metal is precipitated onto the graphite carrier using concentrated formic acid. The content of troublesome metal ions is reduced by 90%.

4. 50 g of a used platinum catalyst on graphite employed over a period of several years are stirred in 50 ml of dilute aqua regia for 16 hours at 80° C. The pH of the suspension is brought to 6 by adding sodium carbonate, and 3.5% strength oxine acetate solution is added. Graphite and the precipitate are separated off and washed with a little water, the wash water being mixed with the filtrate.

49.5 g of fresh graphite are suspended in the combined filtrates, and the suspension is acidified with 10 ml of concentrated aqua regia and stirred for 6 hours at 80° C. Further processing to give the catalyst is carried out by a method similar to that described in experiment 3. In this complete replacement of the carrier, less than 5% by weight of platinum remain on the precipitate and are thus lost.

5/7. Similarly to experiment 4, 1,5-diphenylthiocarbazone (5), quinaldine (6) and 5,7-dibromo-8-hydroxyquinoline (7) are used as precipitating agents, similar results being obtained. In the case of alizarin and aminohydroxybenzenes, the platinum losses are about 5–15% by weight.

B. Testing the catalysts 8. 4.8 g of the catalyst regenerated as described in Example 1 are suspended in 120 ml of 4.3 N $H_2SO_4$ in a glass laboratory reactor, and reacted with 8.4 l/h of a gas mixture consisting of 35.4% of NO and 64.6% of $H_2$ for 4 hours at 40° C. while stirring vigorously (Hösch stirrer, 3500 rpm). Subsequent balancing of the analytical data gives a space-time yield, based on NO, of $$1.064 \frac{\text{l of NO converted}}{\text{l of } H_2SO_4 \cdot \text{molar volume} \cdot \text{residence time [h]}}$$

The yield of hydroxylammonium salt is $$0.850 \frac{\text{l of NO converted to } NH_3OH^+}{\text{l of } H_2SO_4 \cdot \text{molar volume} \cdot \text{residence time}}$$

The corresponding data for a catalyst which has been regenerated but not purified with oxine are given for comparison. The space-time yield in this case is 1.029, but the yield of hydroxylammonium salt is only 0.729.

9. 200 g of the catalyst from Example 2 are suspended in 5 l of 4.3 N $H_2SO_4$ in a large laboratory reactor, and reacted with 255 l/h of a gas mixture consisting of 34.0% of NO and 66.0% of $H_2$ at 40° C., while stirring vigorously (Höosch stirrer, 1000 rpm), until the normality of the acid solution has decreased to about 0.4–0.5. The product solution is then decanted. Fresh sulfuric acid is added, and this reaction is then repeated 3 times. The results in terms of the yield of the hydroxylammonium salt are compared with the corresponding values for a freshly prepared standard catalyst in Table 1 below.

TABLE 1

| Treatment | Catalyst purified according to the invention | Catalyst freshly prepared using pure platinum chloride and fresh carrier |
|---|---|---|
| 1 | 0.58 | 0.64 |
| 2 | 0.60 | 0.55 |
| 3 | 0.56 | 0.56 |
| 4 | 0.55 | 0.55 |

The catalyst regenerated without oxine treatment exhibits insufficient activity even in the first treatment.

10. The tests on the catalysts of experiments 3 to 5 are carried out as described in experiment 6.

TABLE 2

| Catalyst of experiment | Space-time yield | Yield of hydroxylamine |
|---|---|---|
| 3 | 0.925 | 0.79 |
| 4 | 0.942 | 0.82 |
| 5 | 0.946 | 0.80 |
| 6 | 0.957 | 0.83 |
| 7 | 0.939 | 0.81 |

We claim:

1. A process for regenerating a platinum catalyst which is applied on a carrier and has become poisoned by metals as a result of extensive use in the preparation of hydroxylammoniumsalts by the catalytic reduction of nitric oxide with hydrogen in an aqueous mineral acid, which process comprises: dissolving platinum and the metallic impurities in nitric acid or aqua regia; neutralizing the solution and precipitating the metallic impurities from the neutralized solution by means of a precipitating agent selected from the group consisting of 8-hydroxyquinoline, 1,5-diphenylthiocarbazone, quinaldine and 5,7-dibromo-8-hydroxyquinoline, the purified platinum solution being thereafter reused for the preparation of the catalyst.

* * * * *